US008266294B2

(12) United States Patent
Banes et al.

(10) Patent No.: US 8,266,294 B2
(45) Date of Patent: Sep. 11, 2012

(54) ROUTING HINTS

(75) Inventors: John A. Banes, Kirkland, WA (US);
Joseph M. Joy, Redmond, WA (US);
David R. Mowers, Issaquah, WA (US);
Cem Paya, Seattle, WA (US); Feng Sun, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1337 days.

(21) Appl. No.: 10/639,727

(22) Filed: Aug. 13, 2003

(65) Prior Publication Data
US 2005/0038906 A1 Feb. 17, 2005

(51) Int. Cl.
*G06F 15/16* (2006.01)
(52) U.S. Cl. .................. 709/227; 709/228; 709/229
(58) Field of Classification Search .................. None
See application file for complete search history.

(56) References Cited

U.S. PATENT DOCUMENTS

| | | | |
|---|---|---|---|
| 5,968,119 A | 10/1999 | Stedman et al. | |
| 6,055,561 A | 4/2000 | Feldman et al. | |
| 6,065,120 A * | 5/2000 | Laursen et al. | 726/5 |
| 6,081,837 A * | 6/2000 | Stedman et al. | 709/219 |
| 6,085,247 A | 7/2000 | Parsons, Jr. et al. | |
| 6,374,300 B2 | 4/2002 | Masters | |
| 6,473,802 B2 | 10/2002 | Masters | |
| 6,539,494 B1 | 3/2003 | Abramson et al. | |
| 6,539,949 B2 | 4/2003 | Christensen | |
| 6,738,822 B2 * | 5/2004 | Fukasawa et al. | 709/231 |
| 6,813,686 B1 | 11/2004 | Black | |
| 6,928,076 B2 * | 8/2005 | Mehta et al. | 370/392 |
| 6,947,992 B1 * | 9/2005 | Shachor | 709/228 |
| 6,996,630 B1 | 2/2006 | Masaki et al. | |
| 7,111,162 B1 * | 9/2006 | Bagepalli et al. | 713/151 |
| 7,171,473 B1 | 1/2007 | Eftis et al. | |
| 7,200,632 B1 | 4/2007 | Greschler et al. | |
| 7,406,524 B2 | 7/2008 | Sadot et al. | |
| 7,441,265 B2 * | 10/2008 | Staamann et al. | 726/4 |
| 7,493,623 B2 * | 2/2009 | Ruutu | 719/314 |
| 2001/0023442 A1 | 9/2001 | Masters | |
| 2002/0012339 A1 | 1/2002 | Wenzel et al. | |

(Continued)

FOREIGN PATENT DOCUMENTS

CN 1321935 11/2001

(Continued)

OTHER PUBLICATIONS

"TSL Protocol Version 1.0 Spec.", Dierks et al., Jan. 1999, pp. 1-72.

(Continued)

*Primary Examiner* — Krista Zele
*Assistant Examiner* — Azizul Choudhury
(74) *Attorney, Agent, or Firm* — Lee & Hayes, PLLC

(57) ABSTRACT

A first exemplary media implementation includes processor-executable instructions that direct a device to perform actions including: creating a session identifier using a host identifier; and formulating a host session initiation message with the created session identifier. A first exemplary device implementation includes: at least one processor; and one or more media including processor-executable instructions that direct the device to perform actions including: formulating a host session message with a session identifier that is created responsive to a host identifier; and sending the formulated host session message that includes the session identifier from the device. A second exemplary media implementation includes a data structure that has a message including a session identifier field, at least part of the session identifier field including a host identifier. A second exemplary device implementation includes: a host identifier; and a session identifier creator that is adapted to create a session identifier using the host identifier.

56 Claims, 8 Drawing Sheets

U.S. PATENT DOCUMENTS

| | | | |
|---|---|---|---|
| 2002/0091808 A1 | 7/2002 | Fukasawa et al. | |
| 2002/0138848 A1 | 9/2002 | Alao et al. | |
| 2003/0023744 A1 | 1/2003 | Sadot et al. | |
| 2003/0093694 A1* | 5/2003 | Medvinsky et al. | 713/201 |
| 2003/0182429 A1 | 9/2003 | Jagels | |
| 2003/0236905 A1* | 12/2003 | Choi et al. | 709/231 |
| 2004/0006710 A1 | 1/2004 | Pollutro et al. | |
| 2004/0024881 A1* | 2/2004 | Elving et al. | 709/227 |
| 2004/0049594 A1 | 3/2004 | Song et al. | |
| 2005/0038905 A1 | 2/2005 | Banes et al. | |
| 2005/0038906 A1 | 2/2005 | Banes et al. | |

FOREIGN PATENT DOCUMENTS

| | | |
|---|---|---|
| JP | 10051459 | 2/1998 |
| JP | 2002176432 A | 6/2001 |
| JP | 2001265680 | 9/2001 |
| JP | 2001265680 A | 9/2001 |
| JP | 2002189646 A | 7/2002 |
| JP | 2002359637 A | 12/2002 |
| JP | 20023851760 A | 12/2002 |
| KR | 20030041431 | 5/2003 |
| RU | 99122158 | 8/2001 |
| RU | 2178583 | 1/2002 |
| RU | 2207617 | 6/2003 |
| RU | 2232418 | 7/2004 |
| TW | 463508 | 11/2001 |
| TW | 484331 | 4/2002 |
| TW | 536882 B | 6/2003 |
| WO | WO0023920 A1 | 4/2000 |
| WO | WO02080454 | 10/2002 |
| WO | WO02080454 A2 | 10/2002 |
| WO | WO02100117 | 12/2002 |
| WO | WO2005020085 | 3/2005 |

OTHER PUBLICATIONS

Official Notice of Rejection for Russian Patent Application No. 2006104109/09(004463) Mailed on May 5, 2008, (19 pages).

"TSL Protocol Version 1.0 Spec" Jan. 1999 pp. 1-72.

Snoeren, "A Session-Based Architecture for Internet Mobility", MIT PhD, retrieved at <<http://citeseerx.ist.psu.edu/viewdoc/download-?doi=10.1.1.11.7707&rep=re1&type=pdf>>, Feb. 2003.

Salz, et al., "TESLA: A Transparent, Extensible Session-Layer Architecture for End-to-end Network Services", USITS '03 Proceedings of the 4th USENIX Symposium on Internet Technologies and Systems, Mar. 26-28, 2003. pp. 1-19.

The Canadian Office Action mailed Jul. 19, 2011 for Canadian patent application No. 2532185, a counterpart foreign application of U.S. Appl. No. 10/639,727.

The Japanese Office Action mailed Jul. 22, 2011 for Japanese patent application No. 2005-508267, a counterpart foreign application of U.S. Appl. No. 10/639,727.

Kurosaki, "Let's Build a Secure Wireless LAN Environment," Computer & Network LAN, vol. 21, No. 5, pp. 21-40, Ohmsha Ltd., Japan, Apr. 22, 2003.

The Japanese Office Action mailed Mar. 8, 2011 for Japanese Patent Application No. 2009-151291, a counterpart foreign application of U.S. Appl. No. 10/639,727.

The Indian Office Action mailed Mar. 5, 2012 for Indian patent application No. 31/DELNP/2006, a counterpart foreign application of U.S. Appl. No. 10/639,727, 2 pages.

The Chinese Office Action mailed Jan. 29, 2012 for Chinese patent application No. 03826817.5, a counterpart foreign application of U.S. Appl. No. 10/639,727, 6 pages.

The Japanese Office Action mailed Dec. 20, 2011 for Japanese patent application No. 2005-508267, a counterpart foreign application of U.S. Appl. No. 10/639,727, 9 pages.

Office Action for U.S. Appl. No. 10/639,727, mailed on Nov. 16, 2011, John A. Banes, "Routing Hints", 16 pgs.

Non-Final Office Action for U.S. Appl. No. 12/976,819, mailed on Sep. 19, 2011, John Banes, "Routing Hints", 9 pages.

* cited by examiner

| HOST IDENTIFIER (HI)-NETWORK ADDRESS (NA) LINKING TABLE | | | | 506(A) |
| --- | --- | --- | --- | --- |
| HOST IDENTIFIER | 214(1) | NETWORK ADDRESS | | 310(1) |
| HOST IDENTIFIER | 214(2) | NETWORK ADDRESS | | 310(2) |
| ⋮ | ⋮ | ⋮ | | ⋮ |
| HOST IDENTIFIER | 214(n) | NETWORK ADDRESS | | 310(n) |

| HOST IDENTIFIER (HI)-NETWORK ADDRESS (NA) LINKING TABLE | | | | | 506(B) |
| --- | --- | --- | --- | --- | --- |
| HOST IDENTIFIER | 214(1*) | NETWORK ADDR. | 310(1) | APPLIC. IDENTIFIER | 308(1) |
| HOST IDENTIFIER | 214(2*) | NETWORK ADDR. | 310(2) | APPLIC. IDENTIFIER | 308(2) |
| HOST IDENTIFIER | 214(3*) | NETWORK ADDR. | 310(2) | APPLIC. IDENTIFIER | 308(3) |
| ⋮ | ⋮ | ⋮ | ⋮ | ⋮ | ⋮ |
| HOST IDENTIFIER | 214(w) | NETWORK ADDR. | 310(n) | APPLIC. IDENTIFIER | 308(z) |

ROUTING HINTS

TECHNICAL FIELD

This disclosure relates in general to routing hints and in particular, by way of example but not limitation, to providing routing hints from hosts in order to use such routing hints at a network gateway to facilitate intranet routing.

BACKGROUND

Communication has been greatly impacted by the capabilities of the Internet. The Internet enables information to be communicated between two people or other entities quickly and relatively easily using packets. The Internet includes many network nodes that are linked together such that information-containing packets may be transferred between and among them. Some network nodes may be routers that propagate a packet from one link to another, others may be individual client computers, still others may be entire personal networks (e.g., for specific entities), and so forth.

Communication across the Internet between a first entity and a second entity is effectuated by constructing a connection between them. These connections sometime involve sessions. Sessions are established to provide a context for the communication exchanges that occur over the corresponding connection or connections. A session establishment usually involves a one-way or two-way exchange of information between the first and second entities. The complexity and duration of an establishment phase of a session usually varies based on the type of session.

Each session establishment utilizes processing resources and consumes a period of time that translates into a delay that is experienced by users. After the session establishment phase, the first and second entities communicate in accordance with the established session context. The communication, as well as the connection, may cease without terminating the session. In some cases, such existing sessions may thereafter be continued using the information that was previously exchanged between the two entities during the prior session establishment phase, when such information is retained by them.

In other words, the previously-exchanged information is used to continue the existing session. Thus, continuing an existing session is generally relegated to those situations in which the same first and second entities that previously established the session are attempting to continue it. Consequently, problems can arise when a first entity is trying to continue an existing session if the second entity is unknown and/or difficult to identify or contact.

Accordingly, there is a need for schemes and/or techniques that improve, simplify, and/or facilitate a session continuation between two entities.

SUMMARY

In a first exemplary media implementation, one or more processor-accessible media include processor-executable instructions that, when executed, direct a device to perform actions including: creating a session identifier using a host identifier; and formulating a host session initiation message with the created session identifier.

In a first exemplary device implementation, a device includes: at least one processor; and one or more media including processor-executable instructions that are capable of being executed by the at least one processor, the processor-executable instructions adapted to direct the device to perform actions including: formulating a host session message with a session identifier that is created responsive to a host identifier; and sending the formulated host session message that includes the session identifier from the device.

In a second exemplary media implementation, one or more processor-accessible media include a data structure, the data structure including: a message including a session identifier field, at least part of the session identifier field including a host identifier.

In a second exemplary device implementation, a device includes: a host identifier; and a session identifier creator that is adapted to create a session identifier using the host identifier.

Other method, system, approach, apparatus, application programming interface (API), device, media, procedure, arrangement, etc. implementations are described herein.

BRIEF DESCRIPTION OF THE DRAWINGS

The same numbers are used throughout the drawings to reference like and/or corresponding aspects, features, and components.

FIGS. 6A and 6B are exemplary tables that illustrate host identifier and network address linking for use with routing hints.

DETAILED DESCRIPTION

Figure 1:
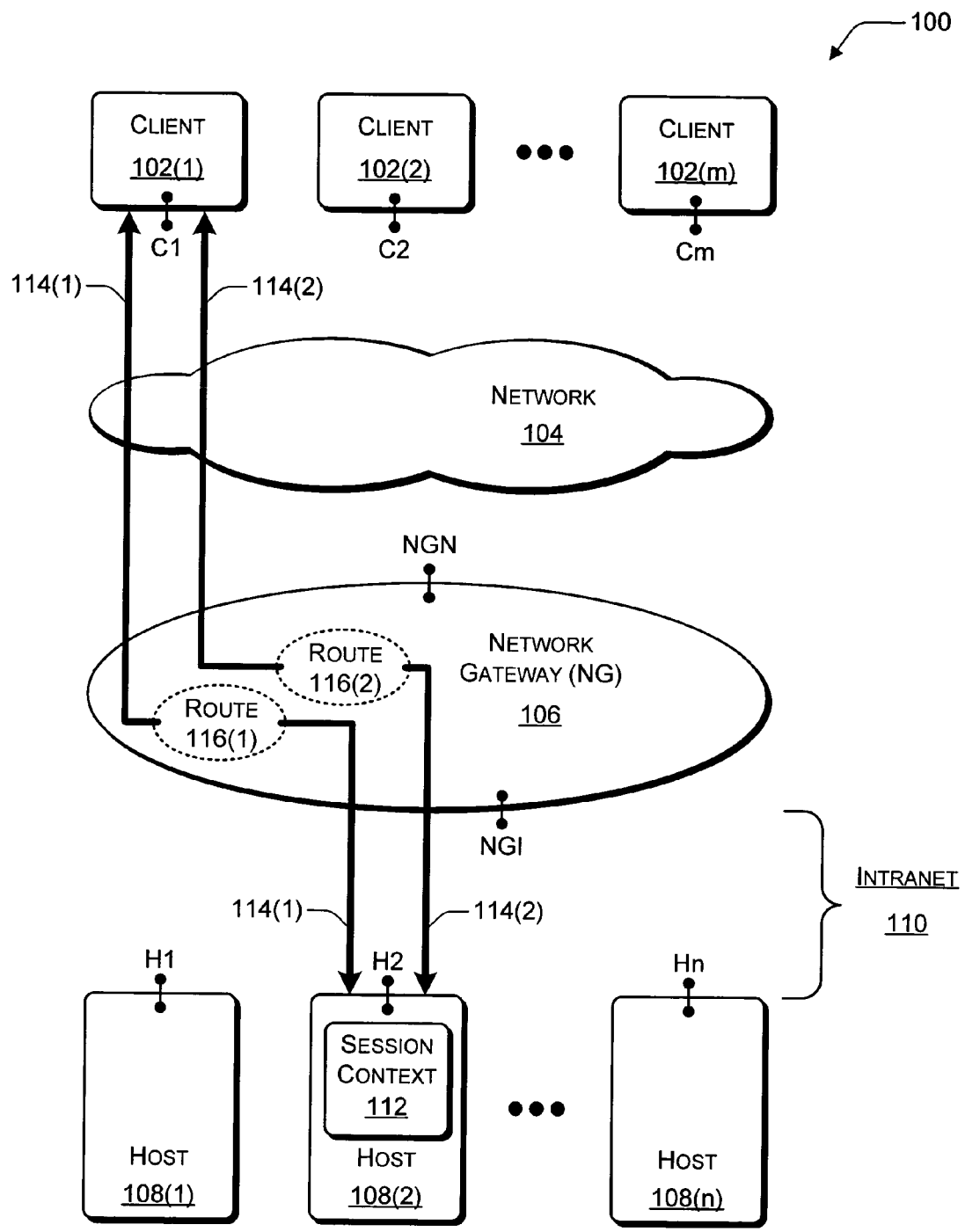
FIG. 1 is an exemplary communications environment that illustrates a first connection that establishes a session and a second connection that continues the session.

FIG. 1 is an exemplary communications environment 100 that illustrates a first connection 114(1) that establishes a session and a second connection 114(2) that continues the session. As illustrated, exemplary communications environment 100 includes multiple clients 102(1), 102(2) ... 102(m) and multiple hosts 108(1), 108(2) ... 108(n), as well as a network 104 and a network gateway (NG) 106. Network gateway 106 serves as a gateway between network 104 and an intranet 110. Hosts 108 are coupled to intranet 110.

In a described implementation, clients 102(1), 102(2) ... 102(m) correspond to addresses "C1", "C2" ... "Cm", respectively. Each of clients 102 may be any device that is capable of network communication, such as a computer, a mobile station, an entertainment appliance, another network, and so forth. Clients 102 may also correspond to a person or other entity that is operating a client device. In other words, clients 102 may comprise logical clients that are users and/or machines.

Network 104 may be formed from one or more networks, such as the Internet, another intranet, a wired or wireless telephone network, a wireless broadband network, and so forth. Additional examples of devices for clients 102 and network types/topologies for network 104 are described below with reference to FIG. 8. Individual clients 102 are capable of communicating with one or more hosts 108, and vice versa, across network 104 via network gateway 106.

Hosts 108(1), 108(2) . . . 108(n) correspond to addresses "H1", "H2" . . . "Hn" respectively. Host addresses H1, H2 . . . Hn are present on intranet 110. Hosts 108 typically host one or more applications (not shown). These applications (i) provide services for interaction and/or communication with clients 102, (ii) are for use by clients 102, and so forth. By way of example only, such applications may include file delivery programs, web site management/server programs, remote access programs, electronic mail programs, database access programs, and so forth.

Each host 108 may correspond to a server and/or a device, multiple servers and/or multiple devices, part of a server and/or part of a device, some combination thereof, and so forth. Particular exemplary implementations for hosts 108 are described further below with reference to FIGS. 2, 4, and 5. Furthermore, additional exemplary device implementations for hosts 108 are described below with reference to FIG. 8.

Network gateway 106 is reachable or locatable through network 104 at one or more addresses "NGN", and network gateway 106 also has a presence on intranet 110 with at least one address "NGI". Communications from clients 102 (or other nodes) that are directed to address NGN of network gateway 106 are received at network gateway 106 and thereafter routed to a host 108 of hosts 108(1), 108(2) . . . 108(n). Network gateway 106 is comprised of one or more network gateway elements (not separately shown in FIG. 1). Each network gateway element 106 may comprise all or a portion of a router, a proxy, a load balancer, a firewall device, some combination thereof, and so forth. Exemplary non-specific device implementations for network gateway elements 106 are also described below with reference to FIG. 8.

Generally, connections 114 are constructed between clients 102 and hosts 108 across network 104 via network gateway 106. Clients 102 usually initiate connections 114, but hosts 108 may alternatively be the initiators. Specifically in this example, client 102(1) initiates a connection 114(1) with host 108(2). However, client 102(1) is not privy to address H2 of host 108(2). Instead, client 102(1) directs the connection (e.g., a packet requesting a connection) to address NGN of network gateway 106.

Network gateway 106 then performs a routing operation 116(1) on connection 114(1) in accordance with some default policy (e.g., rule). As a result, network gateway 106 routes connection 114(1) over intranet 110 to host 108(2) for this example. Generally, network gateway 106 cannot simply send the packets of connections 114 from client 102(1) as-is to host 108(2) at network address H2 because the packets are destination-addressed to address NGN of network gateway 106. Instead, network gateway 106 typically employs one or more of the following exemplary options to route packets across intranet 110: network address translation (NAT), half-NAT, tunneling, some combination thereof, and so forth.

In a transmission control protocol/internet protocol (TCP/IP) environment, NAT is performed by (i) overwriting the source (i.e., client 102(1)) IP address C1 and port number with the IP address NGI and NAT-generated port number of network gateway 106 and (ii) overwriting the destination IP address NGN with the IP address H2 of host 108(2). Half-NAT is performed by overwriting the destination IP address NGN with the IP address H2 of host 108(2) so that the source IP address C1 and port number are preserved. Tunneling is performed by encapsulating each packet within a new IP packet that is addressed to address H2 of host 108(2) and transmitting the encapsulated packets from network gateway 106 to host 108(2), where they can be de-encapsulated.

During connection 114(1), a session is established between client 102(1) and host 108(2). For the established session of connection 114(1), a session context 112 is produced at host 108(2). An analogous, similar, and/or reciprocal session context (not shown) is also usually produced at client 102(1). Session context 112 facilitates communications between client 102(1) and host 108(2).

Thus, connection 114(1) may be or may have established thereon any one or more of many different types of sessions. Exemplary types of sessions include: (i) a Secure Sockets Layer (SSL) session; (ii) a Transport Layer Security (TLS) session; (iii) a secure internet protocol (IPsec) session; (iv) a hyper text transfer protocol (HTTP) cookie-based session; (v) a point-to-point tunneling protocol (PPTP) session; (vi) an IPSec/layer-2 tunneling protocol (L2TP) session; (vii) a proprietary session; (viii) a terminal server session, (ix) an administrator-defined session; (x) and so forth. These examples of different session types also illuminate how layers of sessions may be established and used.

The contents of a session context 112 may vary at least partially in dependence on the type of session for which it was produced. For example, a particular session context 112 may include one or more of the following: a TCP 4-tuple (e.g., for sessions established with a TCP connection); a session identifier; a location for one or more database entries that maintain persistent state for the corresponding session; a public key of client 102(1) that is provided to host 108(2); negotiated private cryptographic key(s); other security-related parameter(s); and so forth. A TCP 4-tuple includes a source IP address, a source TCP port, a destination IP address, and a destination TCP port. By way of example for an SSL session under current standards, the session identifier can be up to 32 bytes in length.

As described above, after connection 114(1) is constructed, a session is established between client 102(1) and host 108(2) in the current example. Client 102(1) is, more specifically, establishing a session with at least one application that is resident at and/or executing on host 108(2). However, for the sake of clarity, such applications may be generally included when referencing host 108(2).

The session establishment phase produces or results in session context 112. Session context 112 provides a context for communication exchange(s) between client 102(1) and host 108(2). Session context 112 can include information that is actually critical, merely beneficial, or otherwise somehow relevant to these communication exchange(s).

Given that client 102(1) may be a logical client, session context 112 may relate to communication exchanges between (i) a specific device and/or a specific user of a device and (ii) host 108(2). Consequently, a session context 112 that is associated with a user client 102(1) may continue to be associated therewith even as the user client 102(1) accesses hosts 108 from different devices. The devices can differ at a local level for client 102(1), at a network 104 level, and so forth. Examples of such different device scenarios include a proxy scenario (e.g., those of some internet service providers (ISPs)), a terminal server session scenario, and so forth.

Session context 112 is stored at host 108(2) and/or accessible therefrom. When connection 114(1) is completed or otherwise ceases, session context 112 may not be used again. On the contrary, session context 112 may be useful again if client 102(1) attempts to initiate another connection with hosts 108 for a same, a similar, or a related, etc. session. If this other connection is not routed to the same host 108(2) that stores session context 112, then client 102(1) has to establish a new session, which can be time consuming, data/processing intensive, and/or frustrating to users (especially a user corresponding to client 102(1)). Without some session affinity preservation mechanism at network gateway 106, there is typically no likelihood greater than random chance that the second connection is also routed to host 108(2).

A session affinity preservation mechanism or functionality is adapted to route connections (including packet-level and logical-level requests) back to a host 108 that is associated with a session context 112 for an existing session that is to be continued with the connection. For example, session affinity preservation functionality attempts to enable a connection 114(2) for client 102(1) to be routed back to host 108(2) to which session context 112 is associated. Such session affinity preservation mechanisms may be implemented in accordance with one or more exemplary strategies. Although applicable to network gateways 106 generally, these exemplary strategies are described from the perspective of a load balancing implementation.

A first strategy relates to load balancing with a "sticky" mode in which most, if not all, requests that are incoming from a given e.g. IP address are routed to a single host 108. However, this strategy relies on an assumption that a given IP address represents a single client 102, which is manifestly untrue for proxies. A proxy appears as single IP address to the load balancer, but it actually represents requests for many, potentially thousands, of clients 102. As a result, routing all of these requests to a single host 108 can lead to a very uneven load balance between/among devices. Usually, devices that receive incoming requests from a proxy are consequentially assigned a much greater number of clients 102. Furthermore, requests from a client 102 that has changing IP addresses are also routed incorrectly using this first strategy. IP addresses can be changing in a mobile environment, when addresses are temporarily allocated from an IP address pool, and so forth.

A second strategy involves employing a load-balancing heuristic that uses a session identifier. Requests to continue an existing session are routed to the host 108 that previously established (e.g., negotiated) that session using the specific individual session identifier. In operation, after a particular session is established between a particular client 102 and a particular host 108, a mapping is stored that links that particular host 108 to that particular session with the session being identified by a particular session identifier. When a request including the particular session identifier from that particular client 102 is received, the request can be routed back to that particular host 108 using the mapping. This second strategy therefore enables preservation of session affinity.

However, the second strategy entails a number of relative drawbacks from an efficiency perspective. First, the load balancer maintains a table of these mappings between session identifiers and hosts 108. The size of this table can be huge because there is a separate entry for each existing session. For example, if each host 108 caches 10,000 sessions and there are 500 hosts 108, the table uses 5 million entries to route requests for these sessions with optimal efficiency. Second, for each newly-established session, the load balancer monitors the session establishment phase until the session identifier is detected and an entry can be added to the table. Third, each time a request to resume a session is received, the load balancer consults the (likely very large) table in order to perform the routing.

Fourth, because the sessions have a lifetime and are aggressively aged-out or evicted from host 108 caches due to overcrowding, the load balancer table also implements some aging mechanism to mirror what the individual hosts 108 are doing or are expected to be doing with their own caches. If the host 108 and load balancer aging mechanisms are not synchronized, the load balancer may prematurely delete state information for sessions that are still valid on host 108, or inversely, it may retain state information for sessions that are no longer present at any host 108.

A third strategy for session affinity preservation functionality can achieve session affinity preservation at network gateway 106 through selective creation/determination of session identifiers for sessions that are being newly established and without a table that requires an entry for each individual session. When determining session identifiers, hosts 108 embed a host identifier therein.

Network gateway 106 extracts a host identifier from a session identifier and routes traffic for a session to which the session identifier is assigned responsive to the host identifier. The third strategy can therefore employ a relatively stateless approach that routes session continuation requests using a table with a bounded number of entries (e.g., a number of entries that equals the number of hosts 108) and/or that routes session continuation requests without using a table that has such per-session entries. Aspects of this third strategy are described further herein.

In the example for communications environment 100, after the session establishment phase is completed as part of connection 114(1), session context 112 is produced at host 108(2). Connection 114(1) thereafter ceases. When a request for connection 114(2) arrives at network gateway 106, a routing operation 116(2) is performed thereon. This connection 114(2) is indicated to be for a continuation of the previously-established session that corresponds to session context 112 by a session identifier assigned thereto. The session identifier includes an identifier of host 108(2) in accordance with the third strategy. Using the host identifier for host 108(2) that is extracted from the session identifier of the session continuation request, connection 114(2) is routed at routing operation 116(2) to host 108(2), which is associated with session context 112.

Items 114(1) and 114(2) may also represent session-related messages (e.g., requests) that occur within a single connection as well as those that occur during two or more connections. Furthermore, certain communications between clients 102 and hosts 108 are described herein as messages. Messages are usually propagated from clients 102 to hosts 108, and vice versa, as one or more packets. Client messages are sent from clients 102, and host messages are sent from hosts 108. Session messages are those messages that relate to sessions (e.g., those that relate to the establishment, continuation/resumption, tearing down, etc. of sessions). An exemplary session message is described further below with reference to FIG. 3.

Session initiation messages are messages sent by clients 102 and/or hosts 108 that relate to initiating a session. Session continuation messages are messages sent by clients 102 and/or hosts 108 that relate to continuing an existing session. Session initiation messages and session continuation messages may have markedly different formats, similar formats, identical formats, and so forth. However, in a described implementation, session initiation messages and session continuation messages have at least similar formats wherein the presence of a session identifier indicates that a client session message is a client session continuation message, and the absence of a session identifier indicates that a client session message is a client session initiation message.

Although the description herein is not so limited, the implementations described below occasionally highlight or focus on load balancing implementations for network gateway 106. Also, although other protocols and combinations of protocols are applicable and may alternatively be used, the description below primarily uses TCP/IP connections and SSL/TLS sessions for the sake of clarity.

By way of example but not limitation, a client session initiation message or client session continuation message may be a "Client Hello" message in accordance with the TLS Protocol Version 1.0 Spec (January 1999). If the Client Hello message includes a session identifier, then it may be a client session continuation message, otherwise it may be a client session initiation message. Similarly, a host session initiation message or host session continuation message may be a "Server Hello" message in accordance with the TLS Protocol Version 1.0 Spec. If the Server Hello message includes a session identifier provided by a client in a Client Hello message to which the Server Hello message is responding, then it may be a host session continuation message. If the Server Hello message is responsive to a Client Hello message that does not include a session identifier, then it may be a host session initiation message. Creating a session identifier for and formulating such a host session initiation message is described further below.

Figure 2:
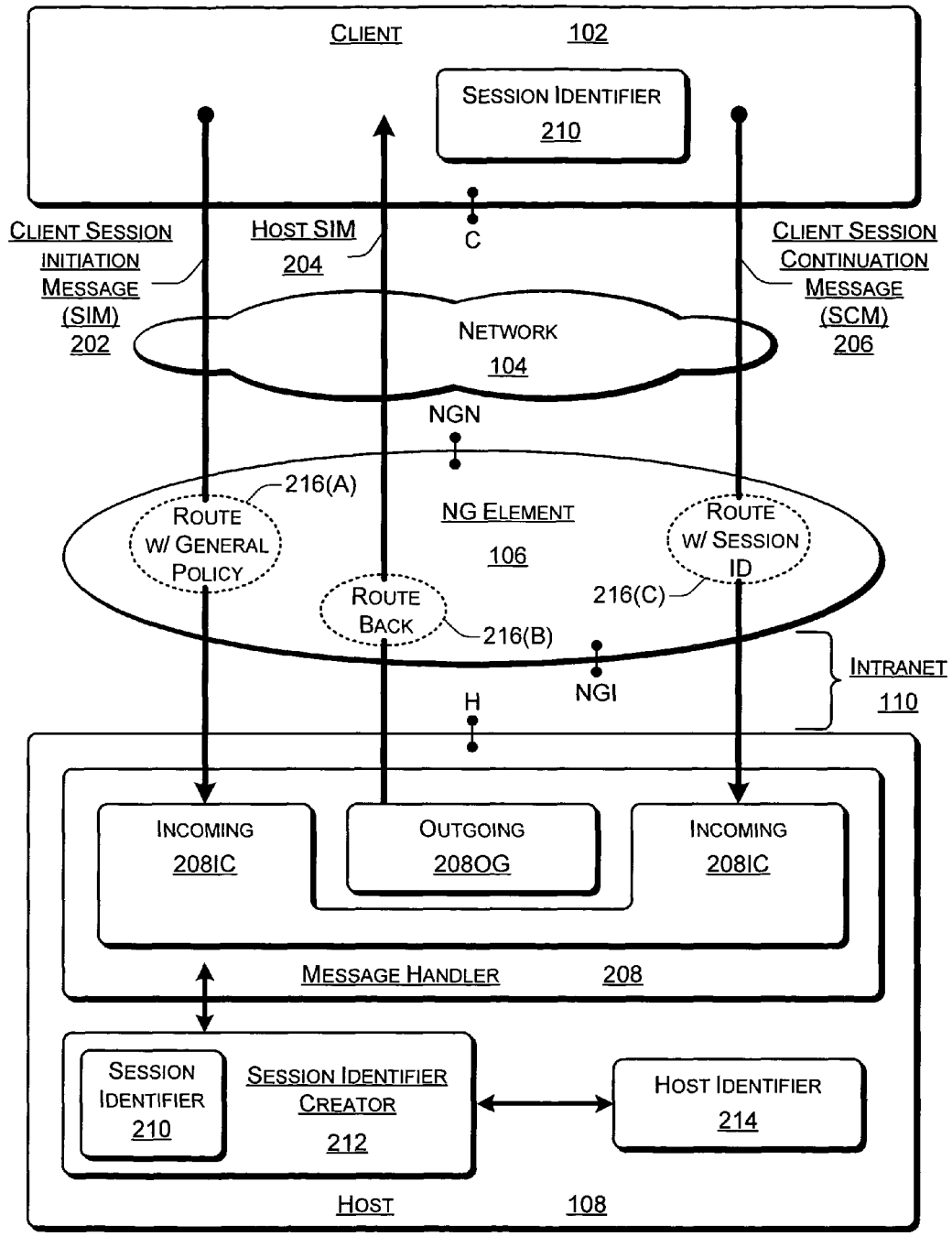
FIG. 2 illustrates an exemplary approach to providing and using routing hints with session messages.

FIG. 2 illustrates an exemplary approach to providing and using routing hints with session messages. Session messages 202, 204, and 206 are sent from client 102 to host 108, or vice versa, across network 104 via a network gateway element 106. Network gateway element 106 represents an element of network gateway 106 (of FIG. 1). Although each of session messages 202, 204, and 206 are shown as being routed by network gateway element 106, each individual session message may alternatively be routed by different individual elements of network gateway 106.

As illustrated, host 108 includes a message handler 208 that handles messages that are being sent to and received from clients 102. Message handler 208 includes an incoming message handler portion 208IC and an outgoing message handler portion 208OG. Host 108 is associated with a host identifier 214, which is stored at or otherwise accessible from host 108. Examples for host identifier 214 are described further below with reference to FIG. 3. Host 108 also includes a session identifier creator 212 that creates session identifiers (e.g., a session identifier 210) using host identifier 214.

In a described implementation, client 102 has an address "C", and network gateway element 106 has addresses NGN and NGI, with addresses C and NGN located on network 104. Host 108 has an address "H", which is located on intranet 110 along with address NGI. Session messages from client 102 are received through network 104 at network gateway element 106. Network gateway element 106 then routes these session messages onward to host 108 over intranet 110 with routing operations 216. In a reverse path, session messages from host 108 are sent/transmitted across intranet 110 to network gateway element 106, which routes them back to client 102 with routing operations 216.

Specifically, client 102 sends a client session initiation message (SIM) 202 over network 104 to network gateway element 106. Client session initiation message 202 does not include a session identifier inasmuch as it comprises a request for a new session. Because client session initiation message 202 is not for an existing session, network gateway element 106 routes client session initiation message 202 to host 108 using a general policy at routing operation 216(A). For example, network gateway element 106 may route client session initiation message 202 in accordance with a current and/or relevant load balancing policy (e.g., a round robin distribution of incoming new session requests).

Host 108 receives client session initiation message 202 through intranet 110 at incoming message handler portion 208IC. Without a session identifier, incoming message handler portion 208IC recognizes client session initiation message 202 as being for a new session. Session identifier creator 212 is activated to create a new session identifier for the requested new session. Session identifier creator 212 ascertains/retrieves host identifier 214.

Session identifier creator 212 uses host identifier 214 to create session identifier 210. For example, session identifier creator 212 inserts host identifier 214 into session identifier 210. Session identifier 210 may also include other values beyond that of host identifier 214. The additional values of session identifier 210 may be created using any of one or more techniques. Such techniques include, but are not limited to, a randomly selected value, a value from an incrementing counter, a security-related value, a hashed value, some combination thereof, and so forth.

In a described implementation, a first portion (i.e., host identifier 214) of session identifier 210 is devoted to identifying the host 108 that currently owns the corresponding session. This first portion is unique across the hosts 108 of a given cluster (i.e., no host 108 shares its host identifier 214 with any other host 108 in the same cluster). The first portion can be an IP address owned by the host 108, an integer that is assigned by an administrator, and so forth. A second portion of session identifier 210 can increase the uniqueness (and the unpredictability) of session identifier 210. A variety of techniques can be used for this second portion, such as a combination of using a global counter that is incremented once for each new session (with rollovers to 0) and of using a pseudo-random and/or a hashing technique.

Session identifier creator 212 provides session identifier 210 to message handler 208. Outgoing message handler portion 208OG prepares/formulates a host session initiation message 204 that includes session identifier 210. Host session initiation message 204 is sent over intranet 110 to network gateway element 106. Network gateway element 106 then uses a route back routing operation 216(B) to send host session initiation message 204 over network 104 to client 102. Although not so illustrated, host session initiation message 204 may alternatively be routed back along a path that does not include network gateway element 106, especially inasmuch as network gateway element 106 can route subsequent client messages without having garnered per-session state information.

Client 102 extracts session identifier 210 from host session initiation message 204 and retains session identifier 210 for possible future use to continue the established session (and for any current use with the established session). At some point, actual use of the established session ceases (e.g., a connection is terminated). In order to continue the established and existing session with host 108, client 102 formulates a client session continuation message (SCM) 206. Client 102 includes the retained session identifier 210 in client session continuation message 206. Client session continuation message 206 is then sent across network 104 from client 102 to network gateway element 106.

When network gateway element 106 receives client session continuation message 206, it detects that client 102 is trying to continue an existing session as indicated by the included session identifier 210. At routing operation 216(C), network gateway element 106 routes client session continuation message 206 using session identifier 210. More specifically, network gateway element 106 routes client session continuation message 206 using host identifier 214 that is part of and extracted from session identifier 210.

Host identifier 214 identifies the host 108 to which it is associated. Hence, network gateway element 106 routes client session continuation message 206 at routing operation 216(C) using an identification of host 108 as indicated by host identifier 214. Client session continuation message 206 is therefore sent across intranet 110 from network gateway element 106 to host 108. At host 108, incoming message handler portion 208IC receives client session continuation message 206 and can begin a continuation of the previously-established session using a stored session context (e.g., session context 112 as shown in FIG. 1).

Host identifier 214 can identify the host 108 with which it is associated in multiple manners. For example, host identifier 214 can comprise the (intranet) network address H of host 108. In this case, network gateway element 106 can route client session continuation message 206 to host 108 without using a session-related table or a host identifier table. In other words, client session continuation message 206 can be forwarded to host 108 using host identifier 214, or at least part thereof, as the destination address of one or more packets that are placed on intranet 110 for client session continuation message 206.

Alternatively, host identifier 214 can map to address H for host 108. Although this mapping manner involves a table (or a computation), the number of entries "n" in the table can be equal to the number of hosts 108 in the server cluster, on intranet 110, in a web farm, and so forth. Thus, this table has a bounded number of entries and does not include per-session state information. With reference to the example used above, if each host 108 caches 10,000 sessions and there are 500 hosts 108, the table may use 500 entries (instead of 5 million) to efficiently route requests for these sessions.

Table 1 below is an exemplary linking data structure that links host identifiers 214 to hosts 108 by way of the addresses of hosts 108.

TABLE 1

Data structure for mapping host identifiers 214 to host addresses H.

| Entry No. | Host Identifier [214] | Host Address [H] |
|---|---|---|
| 1 | host identifier 214 (1) | host address H1 |
| 2 | host identifier 214 (2) | host address H2 |
| . | . | . |
| . | . | . |
| . | . | . |
| n | host identifier 214 (n) | host address Hn |

In operation, network gateway element 106 extracts a host identifier 214(#) from session identifier 210 of client session continuation message 206 as received from client 102. Network gateway element 106 then accesses a linking data structure, such as that of Table 1, using host identifier 214(#) to ascertain the host address H# that is linked thereto. This host address H# corresponds to the address of host 108(#) on intranet 110 and is used as the destination address to route client session continuation message 206 to host 108(#). Exemplary host identifier-to-network address linking tables are described further below with reference to FIGS. 6A and 6B.

Figure 3:
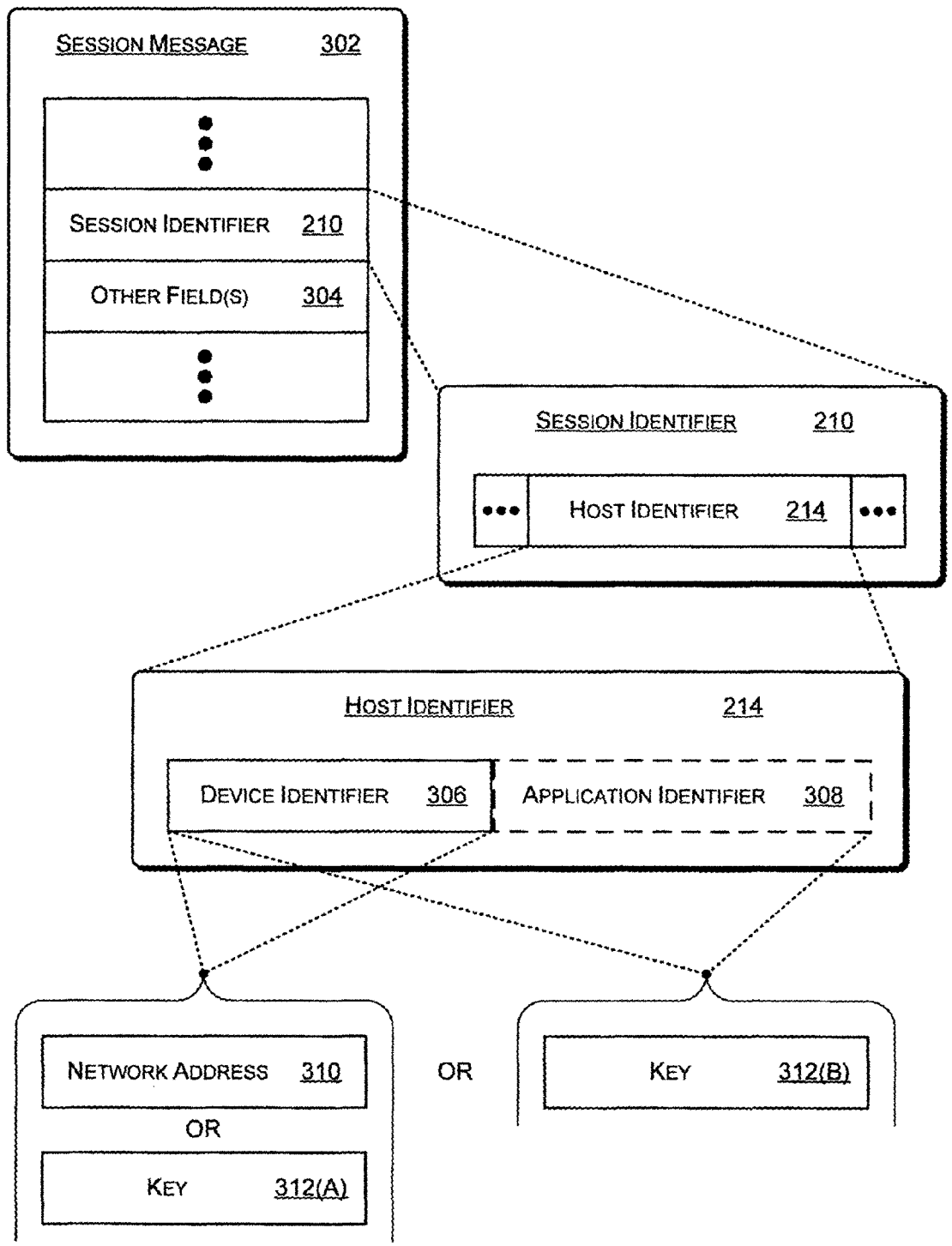
FIG. 3 illustrates an exemplary session message that can include a routing hint.

FIG. 3 illustrates an exemplary session message 302 that can include a routing hint. Session message 302 is a message that relates to one or more sessions. As illustrated, session message 302 includes multiple fields. These multiple fields include session identifier 210 and one or more other fields as represented by other field(s) 304.

Session identifier 210 includes at least one host identifier 214. Host identifier 214 includes a device identifier 306 and optionally an application identifier 308. Device identifier 306 may comprise a network address 310 or a key 312(A). Alternatively, host identifier 214 may include a key 312(B).

In a described implementation, a format or formats for session messages 302 are defined by a network or communication standard or protocol such as SSL/TLS. Session identifier 210 may be located anywhere within session message 302, especially as defined by the applicable standard or protocol. Other fields 304 may include a source and/or destination address, general header information, security type information, other session-related information, data, some combination thereof, and so forth. By way of example, session message 302 may be a Client Hello or a Server Hello message as defined by the TLS Protocol Version 1.0 standard, and session identifier 210 may correspond to the "SessionID" field of either TLS Hello message. An example of a field 304 that includes security type information is a cipher field that indicates which cryptographic options are supported by a session participant (e.g., a client or a host) that is formulating session message 302.

Session identifier 210 includes host identifier 214 and optionally other values that together form a session identifier. This session identifier populates the session identifier 210 field of session message 302. Host identifier 214 may be located anywhere within the field for session identifier 210, including being divided, dispersed, and/or spread over the session identifier 210 field.

In a described implementation for ease of extraction, a sub-field of session identifier 210 that corresponds to host identifier 214 is realized as a contiguous sequence of bytes. The contiguous sequence of bytes appears at a fixed offset from the most-significant byte of session identifier 210. However, the fixed offset may instead be from the least-significant byte.

For additional flexibility host identifier 214 may be configurable externally, instead of being selected by an SSL/TLS component for example. For instance, host identifier 214 may be configured externally by being read as a value from a registry key. As noted above, an administrator may determine host identifiers 214, such as by setting the registry key value or through some other mechanism.

Host identifier 214 may alternatively be embedded in a different field from that of session identifier 210. For example, a particular field that is sent to a client 102 and is returned unchanged from that client 102 when it is requesting resumption of an existing session may be used. This alternative is especially applicable if the message format and underlying protocol permits or requires a host 108 with the desired session context 112 to have created/selected the value for this particular field. For this alternative, network gateway element 106 performs routing operations 216 using the at least part of the contents of this particular field.

Host identifier 214 includes a device identifier 306 and may also include an application identifier 308. Device identifier 306 corresponds to a device of/for a host 108 to which host identifier 214 is associated. As illustrated, device identifier 306 comprises a network address 310 or a key 312(A) that identifies the device of host 108.

Network address 310 is a network address on intranet 110 of a device for host 108. Thus, if device identifier 306 comprises a network address 310, a network gateway element 106 may insert device identifier 306 into a destination field for a packet or packets being forwarded to host 108.

Key 312(A) is a value that maps to a network address on intranet 110 of a device for host 108. This mapping may be effectuated by looking up a network address in a table, by performing a computation (e.g., following a formula, implementing an algorithm, etc.), and so forth. For example, key 312(A) may be linked to a host address H in a data structure such as that described above with reference to Table 1. An exemplary table in which keys 312(A) are linked to network addresses 310 is described further below with reference to FIG. 6A.

When host identifier 214 includes a device identifier 306 and an application identifier 308, host identifier 214 comprises an application endpoint. Application identifier 308 identifies a specific application on a host device that is identified by device identifier 306. Thus, a host identifier 214 that includes a device identifier 306 and an application identifier 308 is capable of identifying a specific application from among multiple applications that are on a single host 108 and/or that are replicated across multiple hosts 108.

A host identifier 214 that includes a device identifier 306 but no application identifier 308 may also comprise an application endpoint. For example, this is especially likely when a device has only one application, when a device is multi-homed, when a NIC of a device owns two IP addresses, and so forth. In either case, host identifier 214 serves to identify a particular application as well as a particular host 108. Consequently, routing of a client session continuation message 206 may be performed expeditiously to the desired application that has session affinity with the requesting client 102.

Host identifier 214 may alternatively include a key 312(B). Key 312(B) is a value that maps (i) to a network address on intranet 110 of a device for host 108 and (ii) to a specific application thereon. Such a mapping enables key 312(B) to map to an application endpoint without using a separate application identifier 308. This mapping may be effectuated by looking up a network address/application identifier pair in a table, by performing a computation (e.g., following a formula, implementing an algorithm, etc.), and so forth. For example, key 312(B) may be linked to a network address 310 and an application identifier 308 in a data structure. An exemplary table in which keys 312(B) are linked to network addresses 310 and application identifiers 308 is described further below with reference to FIG. 6B.

In another alternative implementation, a code may be embedded in a field for session identifier 210 of session message 302. The code may occupy part of or the entire session identifier 210 field. The code can be used to communicate information (e.g., data, commands, etc.) from a host 108 to network gateway element 106 and/or a client 102. The session identifier field of session message 302 may be populated with the code itself and/or with a session identifier 210 that is created using the code. Client 102 and/or network gateway element 106 may extract the code and utilize the communicated information as is, after a mapping (e.g., a looking up, a computation, etc.) of the code, and so forth.

Figure 4:
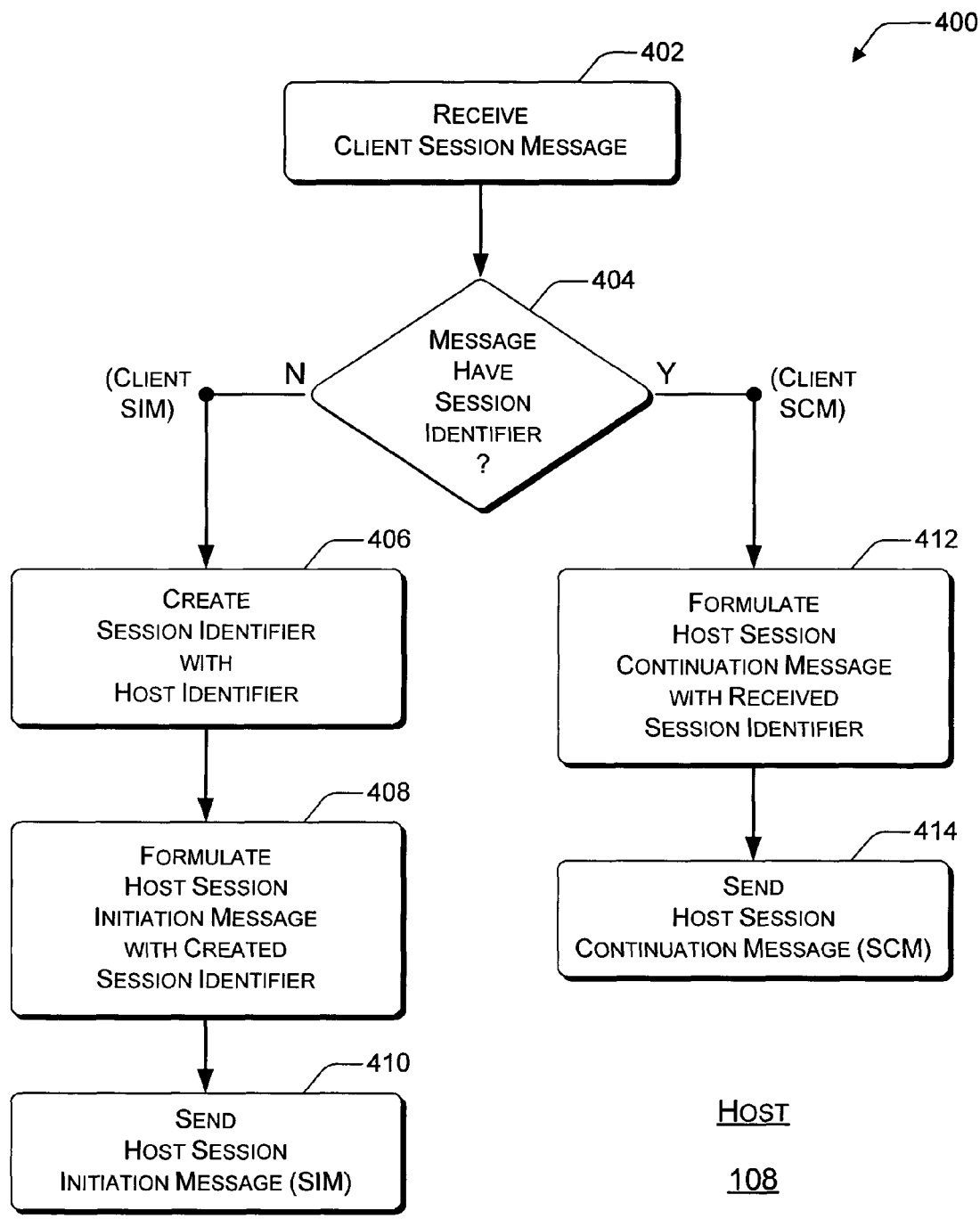
FIG. 4 is a flow diagram that illustrates an exemplary method for providing routing hints.

FIG. 4 is a flow diagram 400 that illustrates an exemplary method for providing routing hints. Flow diagram 400 includes seven blocks 402-414. Although the actions of flow diagram 400 may be performed in other environments and with a variety of hardware architectures and software schemes, FIGS. 1-3 (and 5) are used in particular to illustrate certain aspects and examples of the method. For example, host 108 may perform the described actions.

At block 402, a client session message is received. For example, a host 108 may receive a client session message 202 or 206 (e.g., at an incoming message handler portion 208IC of a message handler 208) from a client 102. At block 404, it is determined if the received client session message includes a session identifier. For example, the received client session message 202 or 206 (e.g., in a format such as session message 302) may be inspected to determine if it has a session identifier 210 in a session identifier field.

If the received client session message includes a session identifier 210, then the received client session message is a client session continuation message (SCM) 206 and the method continues at block 412. If, on the other hand, the received client session message does not include a session identifier 210, then the received client session message is a client session initiation message (SIM) 202 and the method continues at block 406.

At block 406, a session identifier is created with a host identifier. For example, a host identifier 214 for host 108 is used by a session identifier creator 212 to create a session identifier 210. Session identifier creator 212 may insert host identifier 214 into session identifier 210 along with other values thereof.

At block 408, a host session initiation message is formulated with the created session identifier. For example, an outgoing message handler portion 208OG may formulate (e.g., using a format such as that of session message 302) a host session initiation message 204 that is populated with session identifier 210, which includes host identifier 214. At block 410, the host session initiation message is sent. For example, host 108 may transmit host session initiation message 204 to client 102 over network 104 via network gateway element 106.

If, on the other hand, it is determined (at block 404) that the received client session message does include a session identifier, then a host session continuation message is formulated with the received session identifier at block 412. For example, outgoing message handler portion 208OG may formulate (e.g., using a format such as that of session message 302) a host session continuation message (not specifically shown in FIG. 2) that is populated with the received session identifier 210 (which may include a previously-embedded host identifier 214). At block 414, the host session continuation message is sent. For example, host 108 may transmit a host session continuation message to client 102 over network 104 via network gateway element 106.

Figure 5:
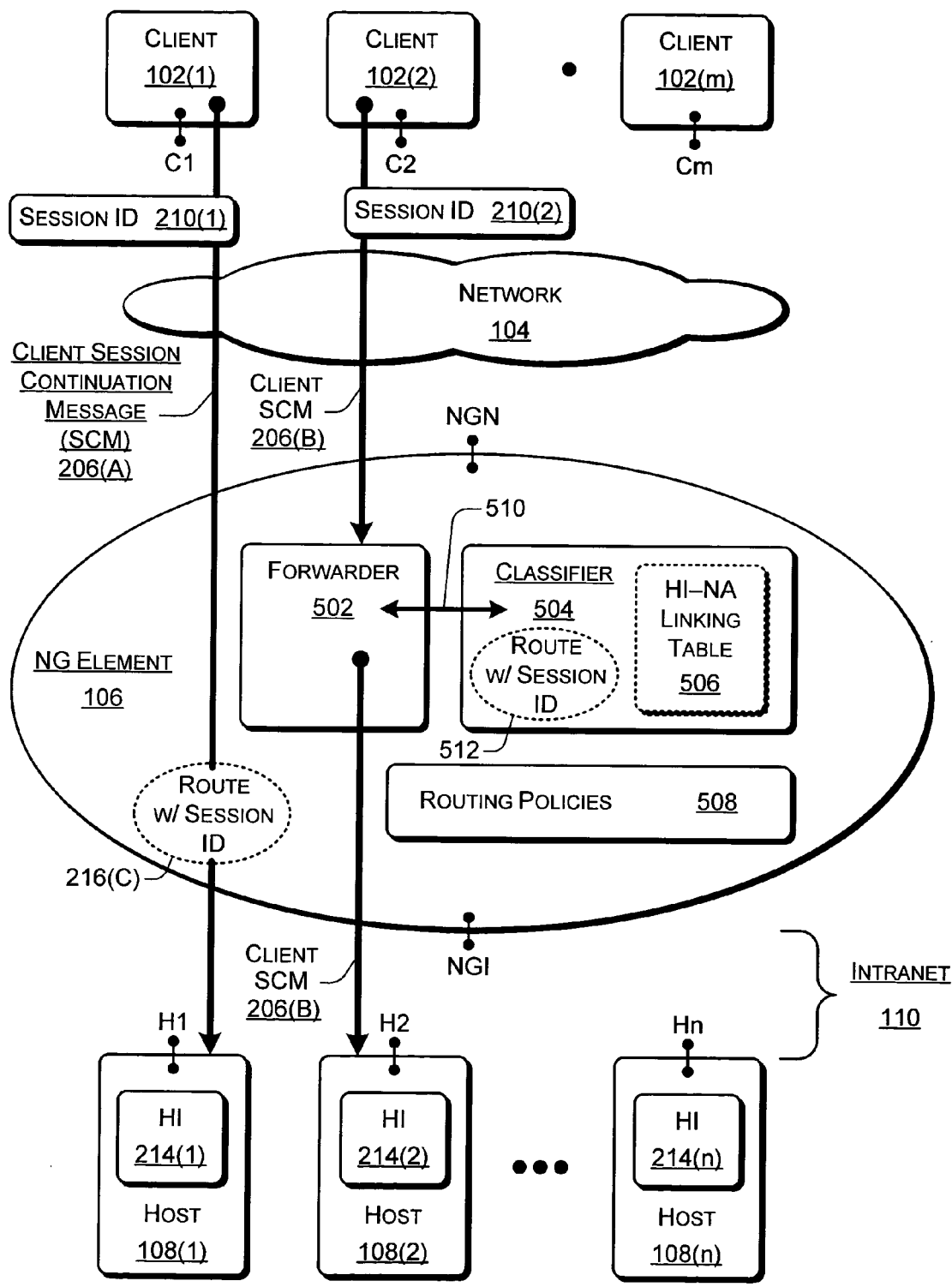
FIG. 5 illustrates another exemplary approach to providing and using routing hints with session messages.

FIG. 5 illustrates another exemplary approach to providing and using routing hints with session messages. This exemplary approach focuses on using routing hints at a network gateway element 106. As illustrated, clients 102(1), 102(2) ... 102(m) submit requests that are addressed to network gateway element 106 at NGN over network 104.

Network gateway element 106 routes these requests to hosts 108(1), 108(2) ... 108(n). Each host 108(1), 108(2) ... 108(n) is associated with a respective host identifier 214(1), 214(2) ... 214(n). Host identifiers 214 may, for example, uniquely identify an application endpoint from among a set of endpoints to which a particular kind of session can potentially be directed.

In a described implementation, network gateway element 106 relates to network load balancing. With network load balancing (or other network gateways with routing functionality), one or more routing policies 508 may be employed. Routing policies 508 may include, for example, those routing policies that an administrator can script or set to cause a network load balancer to route incoming packets and/or requests in prescribed manners. Routing policies 508 may also include more flexible and/or expansive routing policies that rely on real-time parameters, such as health and load information for hosts 108.

A network load balancing implementation for network gateway element 106 may be realized with integrated network load balancing functionality. This implementation is described with regard to client session continuation message 206(A) and routing operation 216(C). A network load balancing implementation for network gateway element 106 may also be realized with separated network load balancing functionality. This implementation is described with regard to client session continuation message 206(B) and routing operation 512.

In this exemplary network load balancing implementation with separated functionality, network gateway element 106 includes a forwarder 502, a classifier 504, and a host identifier (HI)-to-network address (NA) linking table 506. Forwarder 502 forwards packets between clients 102 and hosts 108 using network 104 and intranet 110, respectively. Classifier 504 classifies packets, requests, connections, etc. to perform routing operations in order to effectuate network load balancing functionality and/or session affinity preservation functionality.

Forwarder 502 and classifier 504 may be resident at and executing on different devices of a network gateway 106 or on a single device thereof. Moreover, each of forwarder 502 and classifier 504 may be distributed over more than one device. Furthermore, there may be multiple forwarder 502 components and/or classifier 504 components in a network gateway 106. As illustrated, each classifier 504 includes a host identifier-to-network address linking table 506. Alternatively, a network gateway 106 may have only one host identifier-to-network address linking table 506. Host identifier-to-network address linking table 506 may also be located at and/or associated with different functional component(s).

In operation of an integrated network load balancing implementation, client 102(1) sends client session continuation message 206(A) over network 104 to network gateway element 106 at address NGN. Client 102(1) has previously established a session at host 108(1) and retained a session identifier 210(1) that was assigned to the previously-established session. This session identifier 210(1) includes host identifier 214(1) that is associated with host 108(1). Client session continuation message 206(A) includes session identifier 210(1).

In an implementation with integrated network load balancing functionality, network gateway element 106 performs routing operation 216(C) for client session continuation message 206(A). Because client session continuation message 206(A) has session identifier 210(1) that includes host identifier 214(1), network gateway element 106 routes client session continuation message 206(A) using the host identifier 214(1) portion of session identifier 210(1). Generally, network gateway element 106 routes client session continuation message 206(A) to host 108(1) using host identifier 214(1) as extracted from session identifier 210(1).

Specifically, network gateway element 106 may insert host identifier 214(1) into a destination address field of packet(s) for client session continuation message 206(A) that are being routed to host 108(1). This approach is effective when host identifier 214(1) comprises network address H1 for host 108(1).

Alternatively, network gateway element 106 may also perform a mapping of host identifier 214(1) to network address Hi. For example, a computation operation or a look up operation may be performed for such a mapping. For a computational operation, host identifier 214(1) is mapped to network address HI through some formula, algorithm, and so forth. For a look up operation, host identifier 214(1) is mapped to network address H1 by accessing a host identifier-to-network address table that includes an entry linking host identifier 214(1) to network address H1, such as host identifier-to-network address linking table 506. An example of such a table is described further below with reference to FIG. 6A.

In operation of a separated network load balancing implementation, client 102(2) sends client session continuation message 206(B) over network 104 to network gateway element 106 at address NGN. Client 102(2) has previously established a session at host 108(2) and retained a session identifier 210(2) that was assigned to the previously-established session. This session identifier 210(2) includes host identifier 214(2) that is associated with host 108(2). Client session continuation message 206(B) includes session identifier 210(2).

In an implementation with separated network load balancing functionality, forwarder 502 receives client session continuation message 206(B). Because client session continuation message 206(B) is for a session that is not known to forwarder 502 (and possibly for a new connection as well), forwarder 502 forwards client session continuation message 206(B) to classifier 504 at communication exchange 510. Client session continuation message 206(B) has session identifier 210(2) that includes host identifier 214(2), so classifier 504 classifies client session continuation message 206(B) using the host identifier 214(2) portion of session identifier 210(2) at routing operation 512. Also at communication exchange 510, classifier 504 returns client session continuation message 206(B) to and/or adds a routing entry at forwarder 502 to indicate that messages/packets for this session are to be forwarded to host 108(2).

Thus, classifier 504 and forwarder 502 jointly route client session continuation message 206(B) to host 108(2) using host identifier 214(2) as extracted from session identifier 210(2). As described above with respect to routing operation 216(C), forwarder 502 and classifier 504 (i) may insert host identifier 214(2) into a destination address field, (ii) may perform a mapping (e.g., a computation, a looking up, etc.) of host identifier 214(2) to network address H2, and so forth.

Host identifier-to-network address linking table 506 is described as being part of or otherwise associated with classifier 504. Although host identifier-to-network address linking table 506 is shown as being located at network gateway element 106, it may instead be resident at a different device (e.g., a proxy device). When located at such a proxy device, a network gateway element 106 that has separated or integrated (e.g., network-load-balancing related) functionality can access host identifier-to-network address linking table 506 therefrom.

FIGS. 6A and 6B are exemplary tables 506(A) and 506(B), respectively, that illustrate host identifier 214 and network address 310 linking for use with routing hints. Host identifier-to-network address linking table 506(A) corresponds generally to implementations in which host identifiers 214 map to devices. Host identifier-to-network address linking table 506(B) corresponds generally to implementations in which host identifiers 214 map to application endpoints. However, host identifier-to-network address linking table 506(A) may also map to application endpoints as described above with reference to FIG. 3.

As illustrated, host identifier-to-network address linking table 506(A) links respective host identifiers 214 to respective network addresses 310. Table 506(A) includes multiple entries 602(1A), 602(2A) . . . 602(nA). Each respective entry 602(1A), 602(2A) . . . 602(nA) includes a respective host identifier 214(1), 214(2) . . . 214(n) and a respective network address 310(1), 310(2) . . . 310(n) that is linked thereto.

In a described implementation, table 506(A) includes "n" entries where n equals the number of hosts 108 and each host identifier 214(1), 214(2) . . . 214(n) corresponds to a key 312(A) (of FIG. 3). In such an implementation, network addresses 310(1), 310(2) . . . 310(n) correspond to host addresses H1, H2 . . . Hn, respectively (e.g., of FIG. 5). In operation, a network gateway element 106 accesses table 506(A) with a host identifier 214(#) to locate an entry 602 (#A) that is associated therewith. From that entry 602(#A), a network address 310(#) that is linked to host identifier 214(#) is extracted for use in routing a client session continuation message 206(A) or 206(B) to a host 108(#).

As illustrated, host identifier-to-network address linking table 506(B) links respective host identifiers 214 to respective network addresses 310 and application identifiers 308. Table 506(B) includes multiple entries 602(1B), 602(2B), 602(3B) . . . 602(wB). Each respective entry 602(1B), 602(2B), 602(3B) . . . 602(wB) includes (i) a respective host identifier 214(1*), 214(2*), 214(3*) . . . 214(w) and (ii) a respective network address 310(1), 310(2), 310(2) . . . 310(n) as well as a respective application identifier 308(1), 308(2), 308(3) . . . 308(z) that are linked to the host identifiers 214.

In a described implementation, table 506(B) includes "w" entries where w equals the number of application endpoints on hosts 108, and each host identifier 214(1*), 214(2*), 214(3*) . . . 214(w) corresponds to a key 315(B) (of FIG. 3). By way of explanation and with reference to FIG. 5, the illustrated host identifier-to-network address linking table 506(B) may be utilized in the following exemplary circumstance: Host 108(1) is associated with host identifier 214(1*) and has one application that corresponds to application identifier 308 (1), and address H1 corresponds to network address 310(1). Host 108(2) is associated with host identifiers 214(2*) and 214(3*) and has two applications that correspond to application identifiers 308(2) and 308(3), and address H2 corresponds to network address 310(2).

Additionally, host 108(n) is associated with host identifier 214(w) and has one application that corresponds to application identifier 308(z), and address Hn corresponds to network address 310(n). Variable "z" can equal w, the number of application endpoints, if each application identifier 308 is unique to each application installation. If, on the other hand, application identifiers 308 are shared among application installations of the same application type, z can be less than w.

Figure 7:
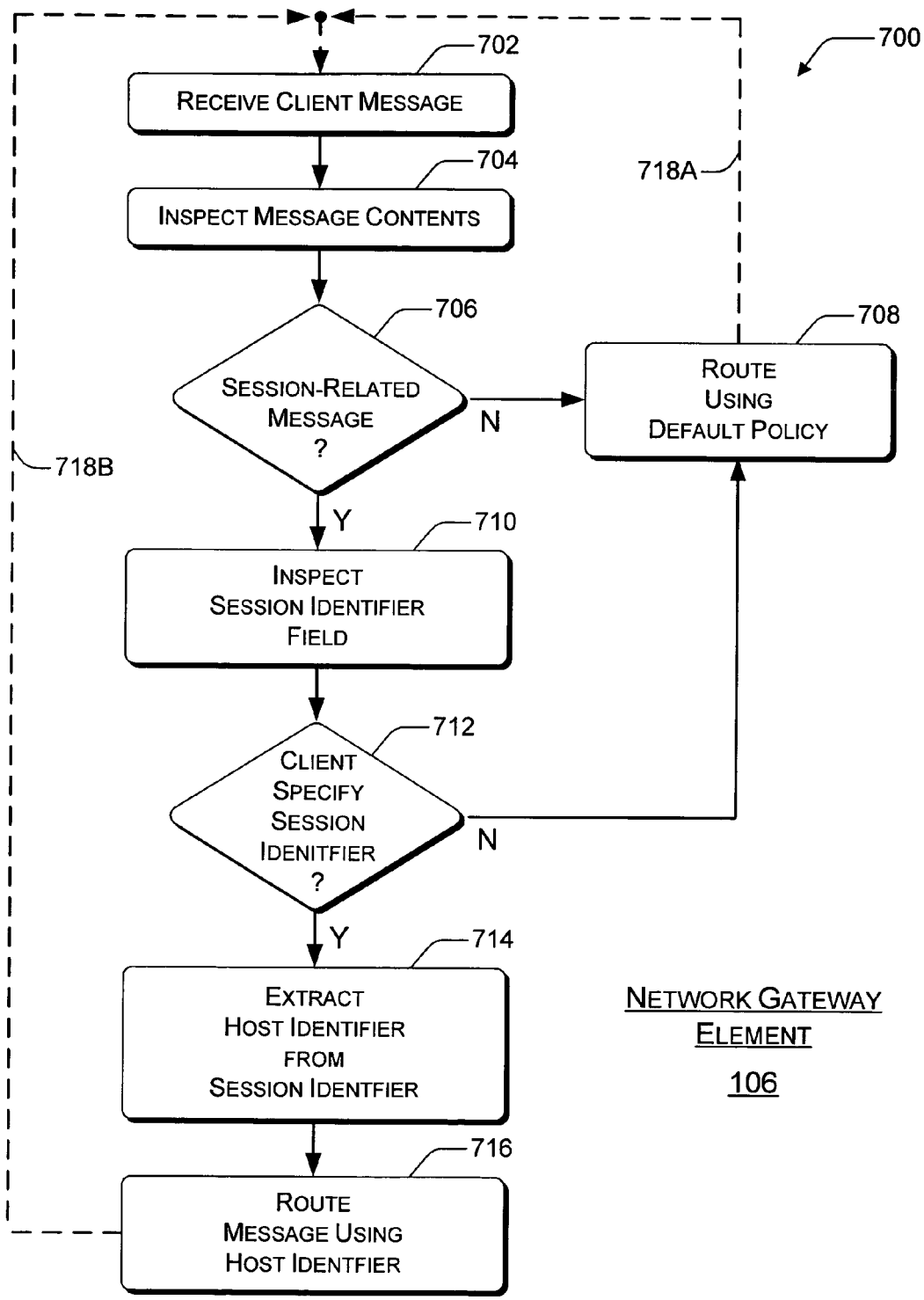
FIG. 7 is a flow diagram that illustrates an exemplary method for using routing hints.

FIG. 7 is a flow diagram 700 that illustrates an exemplary method for using routing hints. Flow diagram 700 includes eight blocks 702-716. Although the actions of flow diagram 700 may be performed in other environments and with a variety of hardware architectures and software schemes, FIGS. 1-3 and 5-6 are used in particular to illustrate certain aspects and examples of the method. For example, one or more network gateway elements 106 may perform the described actions.

At block 702, a client message is received. For example, network gateway element 106 may receive a client message from client 102 through network 104. At block 704, the contents of the received client message are inspected. For example, network gateway element 106 may inspect one or more fields of a session message 302, such as a field for a session identifier 210.

At block 706, it is determined if the received client message is session-related. For example, if the received client message comprises a session message 302 having a field for a session identifier 210, then the received client message is session related. If, on the other hand, the received client message does not have a field for a session identifier 210, then the received client message is not session related and the method continues at block 708.

At block 708, the received client message is routed using a default policy. For example, network gateway element 106 may route the received client message using a general routing policy of routing polices 508 such as a default network-load-balancing policy. As indicated by dashed arrow 718A, network gateway element 106 may then await receipt of the next client message.

If, on the other hand, it is determined (at block 706) that the received client message is session related, then a session identifier field is inspected at block 710. For example, network gateway element 106 may inspect a session identifier field of the received client session message 302. At block 712, it is determined if the client specified a session identifier using the session identifier field. For example, network gateway element 106 may determine whether a session identifier 210 populates a session identifier field of session message 302.

If it is determined (at block 712) that no session identifier was specified, then the received client session initiation message 202 may be routed using a default policy at block 708. If, on the other hand, it is determined (at block 712) that a session identifier was specified by the client, then a host identifier is extracted from the specified session identifier at block 714. For example, network gateway element 106 may extract a host identifier 214 from session identifier 210 as specified in the received client session continuation message 206.

At block 716, the received client message is routed using the extracted host identifier. For example, the received client session continuation message 206 may be routed by network gateway element 106 to the host 108 that is associated with host identifier 214. This routing may entail an unmodified insertion of host identifier 214 into a destination field for a packet or packets being forwarded to host 108 or a mapping of host identifier 214 to at least a network address 310. The mapping may be effectuated by looking up network address 310 in a table 506 using host identifier 214, by performing a computation (e.g., following a formula, implementing an algorithm, etc.) on host identifier 214 that results in network address 310, and so forth.

Especially for implementations in which network gateway element 106 is a network load balancer, network gateway element 106 may have access to health and/or load information relating to multiple hosts 108. This health and/or load information may indicate that a destination (e.g., a host 108 and/or an application endpoint thereof) that is associated with an extracted host identifier 214 is unsuitable or unable to handle a session continuation because of health and/or load reasons. In such a case, network gateway element 106 may perform the action(s) of block 708 for default routing policies even when a client 102 has specified a session identifier 210 that includes a host identifier 214.

After the action(s) of block 716, as indicated by dashed arrow 718B, network gateway element 106 may await receipt of the next client message. Network gateway element 106 may route the received client session continuation message 206 using the extracted host identifier 214 in a number of ways in dependence on the type of host identifier 214 that was extracted.

For example, network gateway element 106 may route the received client session continuation message 206 directly to the intended application if host identifier 214 includes a device identifier 306 and an application identifier 308 or if a key 312(B) maps to a device and an application for a host 108. Additionally, network gateway element 106 may be capable of routing the received client session continuation message 206 to the affinitized host 108 using a network address 310 implementation of a device identifier 306 of host identifier 214, in which network address 310 is used as the destination address for the routed packet or packets.

Alternatively, network gateway element 106 may use a key 312(A) implementation of a device identifier 306 of host identifier 214 to look up a network address 310 for the device of the affinitized host 108. For instance, a key 312(#) may be used to access a table 506(A) (e.g., a data structure) that maps keys 312(A) to network addresses 310 of hosts 108. An entry 602(#A) having key 312(#) is located in the data structure. A network address 310(#) that is linked to key 312(#) in that located entry 602(#A) is extracted and used to route client session continuation message 206 to the affinitzed host 108.

Moreover, network gateway element 106 may use an application-endpoint-specific key 312(B) implementation of a device identifier 306 and application identifier 308 of a host identifier 214 to look up a network address 310 for the device of the affinitized host 108 and an application identifier 308 for an application thereof. For instance, a key 312(#) may be used to access a table 506(B) (e.g., a data structure) that maps keys 312(B) to application endpoints of hosts 108. An entry 602 (#B) having key 312(#) is located in the data structure. An application endpoint (e.g., a network address 310(#) and an application identifier 308(#)) that is linked to key 312(#) in that located entry 602(#B) is extracted and used to route client session continuation message 206 to a particular application on a particular device of/for the affinitzed host 108.

The actions, aspects, features, components, etc. of FIGS. 1-7 are illustrated in diagrams that are divided into multiple blocks. However, the order, number, placement, interconnections, layout, etc. in which these multiple blocks of FIGS. 1-7 are described and/or shown is not intended to be construed as a limitation, and any number of the blocks can be combined, rearranged, augmented, omitted, etc. in any manner to implement one or more systems, methods, devices, procedures, media, application programming interfaces (APIs), apparatuses, arrangements, etc. for routing hints. Furthermore, although the description herein includes references to specific implementations (and the exemplary operating environment of FIG. 8), the illustrated and/or described implementations can be implemented in any suitable hardware, software, firmware, or combination thereof and using any suitable network organization(s), transport/communication protocols(s), client-server architecture(s), and so forth.

Figure 8:
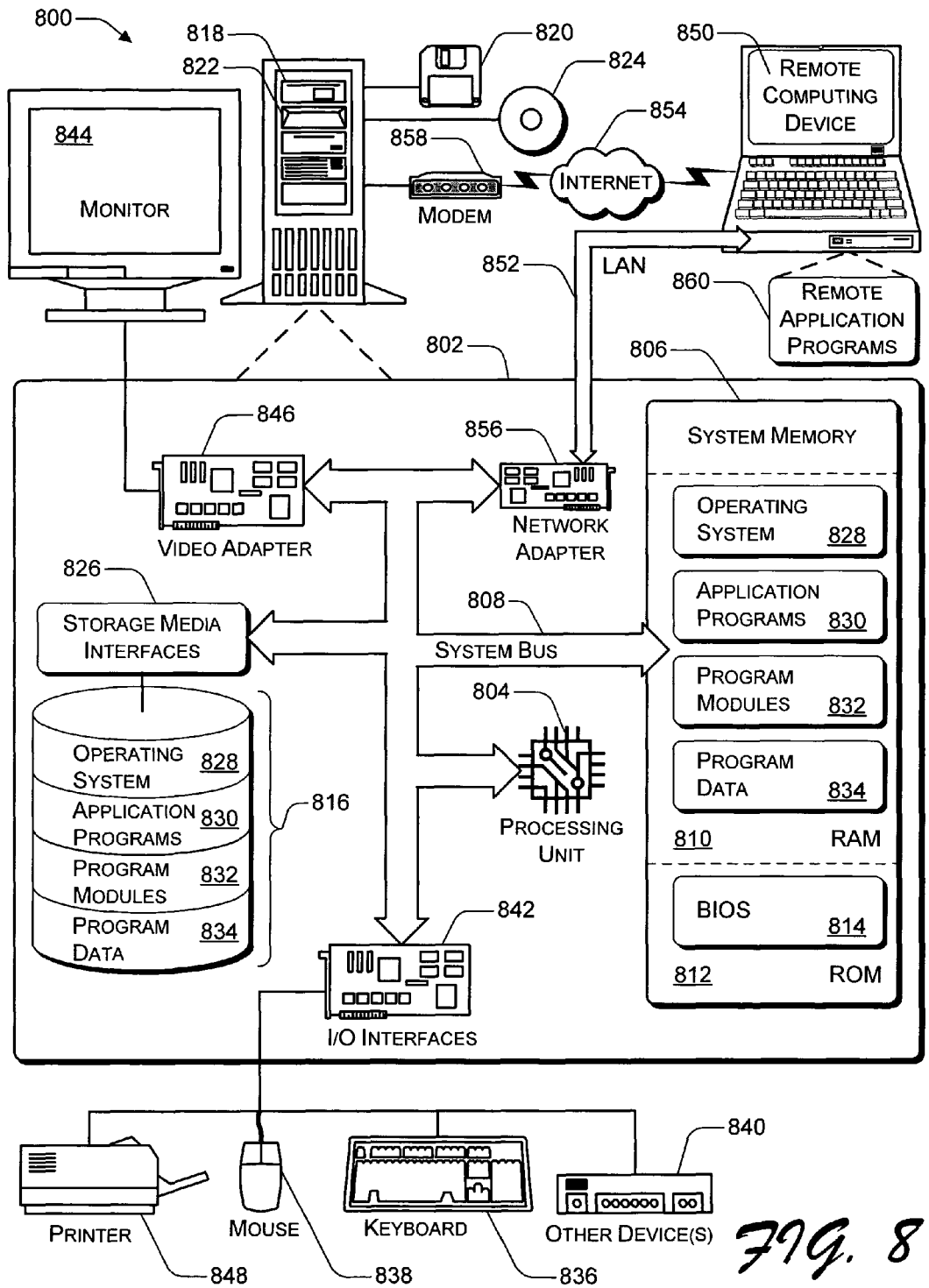
FIG. 8 illustrates an exemplary computing (or general device) operating environment that is capable of (wholly or partially) implementing at least one aspect of routing hints as described herein.

FIG. 8 illustrates an exemplary computing (or general device) operating environment 800 that is capable of (fully or partially) implementing at least one system, device, apparatus, component, arrangement, protocol, approach, method, procedure, media, API, some combination thereof, etc. for routing hints as described herein. Operating environment 800 may be utilized in the computer and network architectures described below or in a stand-alone situation.

Exemplary operating environment 800 is only one example of an environment and is not intended to suggest any limitation as to the scope of use or functionality of the applicable device (including computer, network node, entertainment device, mobile appliance, general electronic device, etc.) architectures. Neither should operating environment 800 (or the devices thereof) be interpreted as having any dependency or requirement relating to any one or to any combination of components as illustrated in FIG. 8.

Additionally routing hints may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, network nodes, distributed or multi-processing computing environments that include any of the above systems or devices, some combination thereof, and so forth.

Implementations for routing hints may be described in the general context of processor-executable instructions. Generally, processor-executable instructions include routines, programs, protocols, objects, interfaces, components, data structures, etc. that perform and/or enable particular tasks and/or implement particular abstract data types. Routing hints, as described in certain implementations herein, may also be practiced in distributed processing environments where tasks are performed by remotely-linked processing devices that are connected through a communications link and/or network. Especially in a distributed computing environment, processor-executable instructions may be located in separate storage media, executed by different processors, and/or propagated over transmission media.

Exemplary operating environment 800 includes a general-purpose computing device in the form of a computer 802, which may comprise any (e.g., electronic) device with computing/processing capabilities. The components of computer 802 may include, but are not limited to, one or more processors or processing units 804, a system memory 806, and a system bus 808 that couples various system components including processor 804 to system memory 806.

Processors 804 are not limited by the materials from which they are formed or the processing mechanisms employed therein. For example, processors 804 may be comprised of semiconductor(s) and/or transistors (e.g., electronic integrated circuits (ICs)). In such a context, processor-executable instructions may be electronically-executable instructions. Alternatively, the mechanisms of or for processors 804, and thus of or for computer 802, may include, but are not limited to, quantum computing, optical computing, mechanical computing (e.g., using nanotechnology), and so forth.

System bus 808 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 802 typically includes a variety of processor-accessible media. Such media may be any available media that is accessible by computer 802 or another (e.g., electronic) device, and it includes both volatile and non-volatile media, removable and non-removable media, and storage and transmission media.

System memory 806 includes processor-accessible storage media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is typically stored in ROM 812. RAM 810 typically contains data and/or program modules/instructions that are immediately accessible to and/or being presently operated on by processing unit 804.

Computer 802 may also include other removable/non-removable and/or volatile/non-volatile storage media. By way of example, FIG. 8 illustrates a hard disk drive or disk drive array 816 for reading from and writing to a (typically) non-removable, non-volatile magnetic media (not separately shown); a magnetic disk drive 818 for reading from and writing to a (typically) removable, non-volatile magnetic disk 820 (e.g., a "floppy disk"); and an optical disk drive 822 for reading from and/or writing to a (typically) removable, non-volatile optical disk 824 such as a CD, DVD, or other optical media. Hard disk drive 816, magnetic disk drive 818, and optical disk drive 822 are each connected to system bus 808 by one or more storage media interfaces 826. Alternatively, hard disk drive 816, magnetic disk drive 818, and optical disk drive 822 may be connected to system bus 808 by one or more other separate or combined interfaces (not shown).

The disk drives and their associated processor-accessible media provide non-volatile storage of processor-executable instructions, such as data structures, program modules, and other data for computer 802. Although exemplary computer 802 illustrates a hard disk 816, a removable magnetic disk 820, and a removable optical disk 824, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the exemplary operating environment 800.

Any number of program modules (or other units or sets of instructions/code) may be stored on hard disk 816, magnetic disk 820, optical disk 824, ROM 812, and/or RAM 810. These program modules may include, by way of general example, an operating system 828, one or more application programs 830, other program modules 832, and program data 834.

A user may enter commands and/or information into computer 802 via input devices such as a keyboard 836 and a pointing device 838 (e.g., a "mouse"). Other input devices 840 (not shown specifically) may include a microphone, joystick, game pad, satellite dish, serial port, scanner, and/or the like. These and other input devices are connected to processing unit 804 via input/output interfaces 842 that are coupled to system bus 808. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 844 or other type of display device may also be connected to system bus 808 via an interface, such as a video adapter 846. Video adapter 846 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 844, other output peripheral devices may include components such as speakers (not shown) and a printer 848, which may be connected to computer 802 via input/output interfaces 842.

Computer 802 may operate in a networked environment using logical connections to one or more remote computers, such as a remote computing device 850. By way of example, remote computing device 850 may be a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 850 is illustrated as a portable computer that may include many or all of the elements and features described herein with respect to computer 802.

Logical connections between computer 802 and remote computer 850 are depicted as a local area network (LAN) 852 and a general wide area network (WAN) 854. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth. Such networks and communications connections are examples of transmission media.

When implemented in a LAN networking environment, computer 802 is usually connected to LAN 852 via a network interface or adapter 856. When implemented in a WAN networking environment, computer 802 typically includes a modem 858 or other means for establishing communications over WAN 854. Modem 858, which may be internal or external to computer 802, may be connected to system bus 808 via input/output interfaces 842 or any other appropriate mechanism(s). It is to be appreciated that the illustrated network connections are exemplary and that other means of establishing communication link(s) between computers 802 and 850 may be employed.

Furthermore, other hardware that is specifically designed for servers may be employed. For example, SSL acceleration cards can be used to offload SSL computations. Additionally, especially in a network load balancing operating environment, TCP offload hardware and/or packet classifiers on network interfaces or adapters 856 (e.g., on network interface cards) may be installed and used at server devices.

In a networked environment, such as that illustrated with operating environment 800, program modules or other instructions that are depicted relative to computer 802, or portions thereof, may be fully or partially stored in a remote media storage device. By way of example, remote application programs 860 reside on a memory component of remote computer 850 but may be usable or otherwise accessible via computer 802. Also, for purposes of illustration, application programs 830 and other processor-executable instructions such as operating system 828 are illustrated herein as discrete blocks, but it is recognized that such programs, components, and other instructions reside at various times in different storage components of computing device 802 (and/or remote computing device 850) and are executed by processor(s) 804 of computer 802 (and/or those of remote computing device 850).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. One or more processor-accessible recording media comprising processor-executable instructions stored thereon that, when executed, direct a host device to perform operations comprising:
   receiving, by the host device, a request from a client for a content;
   creating, by the host device, a session identifier using a host identifier, the host identifier being unique to the host across a plurality of hosts belonging to a cluster of hosts and the host identifier not being unique as to another host belonging to another cluster of hosts, wherein the creating comprises creating the session identifier by including the host identifier as part of the created session identifier;
   formulating, by the host device, a host session initiation message with the created session identifier, wherein the host device is a source of the content requested by the client;
   storing the host identifier at the host device, and wherein the host identifier is divided and dispersed across a first field of the session identifier by the host device when creating the session identifier;
   establishing, by the host device, the corresponding session to which the created session identifier is assigned, wherein a type of the corresponding session to which the created session identifier is assigned comprises one of a Secure Sockets Layer (SSL) session; a Transport Layer Security (TLS) session, a secure internet protocol (IPSec) session; a hyper text transfer protocol cookie-based session, a point-to-point tunneling protocol (PPTP) session, an IPSec/layer-2 tunneling protocol (L2TP) session, a proprietary session, a terminal server session, or an administrator-defined session; and
   establishing, by the host device, at least one layer comprising at least two of the types of sessions;
   populating a second field of the session identifier with a value increasing uniqueness for the session identifier, the session identifier comprising the first field and the populated second field; and
   formulating a host session initiation message to include the first field and the populated second field for a given session, wherein a content of the first field and a content of the populated second particular field is returned unaltered in a client session continuation message for the given session.

2. The one or more processor-accessible recording media as recited in claim 1, wherein operations further comprise:
   sending the formulated host session initiation message that includes the created session identifier.

3. The one or more processor-accessible recording media as recited in claim 2, wherein the sending comprises:
   sending the formulated host session initiation message that includes the created session identifier towards a client.

4. The one or more processor-accessible recording media as recited in claim 2, wherein the sending comprises:
   sending the formulated host session initiation message that includes the created session identifier towards a client via a network gateway.

5. The one or more processor-accessible recording media as recited in claim 1, wherein operations further comprise:
   receiving a client session message; and
   determining if the received client session message includes a received session identifier.

6. The one or more processor-accessible recording media as recited in claim 5, wherein operations further comprise:
   if the received client session message is determined to not include a received session identifier, performing the actions of creating and formulating.

7. The one or more processor-accessible recording media as recited in claim 5, wherein operations further comprise:
   if the received client session message is determined to include a received session identifier, then performing actions of:
   formulating a host session continuation message with the received session identifier; and
   sending the formulated host session continuation message that includes the received session identifier.

8. The one or more processor-accessible recording media as recited in claim 5, wherein the operations further comprise, if the received client session message is determined to include a received session identifier, then:
   formulating a host session continuation message with the received session identifier; and
   sending the host session continuation message that includes the received session identifier from the device.

9. The one or more processor-accessible recording media as recited in claim 1, wherein the formulating comprises:
   inserting the created session identifier into a session identifier field of a host session message to generate the formulated host session initiation message.

10. The one or more processor-accessible recording media as recited in claim 9, wherein the formulating further comprises:
    populating a plurality of other fields of the host session message to generate the formulated host session initiation message.

11. The one or more processor-accessible recording media as recited in claim 1, wherein the host identifier comprises a device identifier.

12. The one or more processor-accessible recording media as recited in claim 11, wherein the device identifier comprises at least one of a network address and a key that maps to the network address.

13. The one or more processor-accessible recording media as recited in claim 1, wherein the host identifier comprises a device identifier and an application identifier.

14. The one or more processor-accessible recording media as recited in claim 1, wherein the host identifier comprises a key that maps to a network address and an application identifier.

15. The one or more processor-accessible recording media as recited in claim 1, wherein the computer-executable instructions comprise a server program.

16. The one or more processor-accessible recording media as recited in claim 1, wherein the computer-executable instructions comprise an operating system program.

17. The one or more processor-accessible recording media as recited in claim 1, wherein a code included in the session identifier signifies a host participant and a client participant to a given session, wherein the client participant is associated with a plurality of client device identifiers, and the code facilitates the client participant accessing the given session from a corresponding plurality of client devices.

18. The one or more processor-accessible recording media as recited in claim 1, wherein the creating the session identifier further comprises using at least one value of the following: a randomly selected value, a value from an incrementing counter, a security-related value, or a hashed value.

19. The one or more processor-accessible recording media as recited in claim 1, wherein the operations further comprise sending the host session initiation message that includes the created session identifier towards a client via a network gateway and over an intranet to which the host device is connected.

20. The one or more processor-accessible recording media as recited in claim 1, wherein the operations further comprise:
receiving a session message that includes the created session identifier from the client;
resuming the corresponding session to which the created and received session identifier is assigned;
formulating a session message that includes the created and received session identifier in response to the received session message that includes the created session identifier; and
sending the session message that includes the created and received session identifier toward the client via the network gateway to indicate that the corresponding session may be continued.

21. The one or more processor-accessible recording media as recited in claim 1, wherein the operations further comprise:
populating a session identifier field with a code signifying the host device and a client participant to a session, wherein the client participant is associated with a plurality of client device identifiers and the code facilitates the client participant accessing the session from a corresponding plurality of client devices; and
formulating a host session message from the host device to include the populated session identifier field, wherein the code is capable of communicating information to devices other than the host device and the plurality of client devices.

22. The one or more processor-accessible recording media as recited in claim 1, wherein session affinity is preserved without a table comprising an entry for each session.

23. The one or more processor-accessible recording media as recited in claim 1, wherein the operations are employed for routing hints.

24. The one or more processor-accessible recording media as recited in claim 1, further comprising instructions for populating a session identifier field with a code signifying the host participant and a client participant to a session, wherein the client participant is associated with a plurality of client device identifiers, and the code facilitates the client participant accessing the session from a corresponding plurality of client devices.

25. A method comprising:
creating, by a host device, a session identifier using a host identifier from the host device, the host identifier being unique to the host across a plurality of hosts belonging to a cluster of hosts and the host identifier not being unique as to another host belonging to another cluster of hosts;
formulating, by the host device, a host session initiation message with the created session identifier, wherein the host device is a source of a content requested by a client;
storing the host identifier at the host device, and wherein the host identifier is divided and dispersed across a first field of the session identifier by the host device when creating the session identifier;
establishing, by the host device, the corresponding session to which the created session identifier is assigned, wherein a type of the corresponding session to which the created session identifier is assigned comprises one of a Secure Sockets Layer (SSL) session; a Transport Layer Security (TLS) session, a secure internet protocol (IPSec) session; a hyper text transfer protocol cookie-based session, a point-to-point tunneling protocol (PPTP) session, an IPSec/layer-2 tunneling protocol (L2TP) session, a proprietary session, a terminal server session, or an administrator-defined session;
establishing, by the host device, at least one layer comprising at least two of the types of sessions;
populating a second field of the session identifier with a value increasing uniqueness for the session identifier, the session identifier comprising the first field and the populated second field; and
formulating a host session initiation message to include the first field and the populated second field for a given session, wherein a content of the first field and a content of the populated second particular field is returned unaltered in a client session continuation message for the given session.

26. The method as recited in claim 25, further comprising:
sending the formulated host session initiation message towards a client.

27. The method as recited in claim 25, wherein the method is implemented by one or more processor-accessible storage media.

28. The method as recited in claim 25, wherein the creating the session identifier further comprises using the host identifier and at least one value of the following: a randomly selected value, a value from an incrementing counter, a security-related value, and a hashed value.

29. The method as recited in claim 25, wherein the operations further comprise sending the formulated host session initiation message that includes the created session identifier towards a client via a network gateway and over an intranet to which the device is connected.

30. The method as recited in claim 25, further comprising:
receiving a client session message;
determining if the received client session message includes a received session identifier;
if the received client session message is determined to include the received session identifier, then:
formulating a host session continuation message with the received session identifier; and
sending the host session continuation message that includes the received session identifier from the device.

31. The method as recited in claim 25, further comprising:
receiving a session message that includes the created session identifier from the client;
resuming the corresponding session to which the created and received session identifier is assigned;
formulating a session message that includes the created and received session identifier in response to the received session message that includes the created session identifier; and
sending the session message that includes the created and received session identifier toward the client via the network gateway to indicate that the corresponding session may be continued.

32. The method as recited in claim 25, further comprising:
populating a session identifier field with a code signifying the host device and a client participant to a session, wherein the client participant is associated with a plurality of client device identifiers, and the code facilitates the client participant accessing the session from a corresponding plurality of client devices; and
formulating a host session message from the host device to include the populated session identifier field, wherein the code is capable of communicating information to devices other than the host device and the plurality of client devices.

33. The method as recited in claim 25, wherein session affinity is preserved without a table comprising an entry for each session.

34. The method as recited in claim 25, wherein the method is employed for routing hints.

35. The method as recited in claim 25, wherein a code included in the session identifier signifies a host participant and a client participant to a given session, wherein the client participant is associated with a plurality of client device identifiers, and the code facilitates the client participant accessing the given session from a corresponding plurality of client devices.

36. A host device comprising:
   at least one processor; and
   one or more media including processor-executable instructions that, when executed by the at least one processor, direct the host device to perform operations comprising:
   receiving, by the host device, a request from a client for a content;
   creating, by the host device, a session identifier using a host identifier, the host identifier being unique to the host across a plurality of hosts belonging to a cluster of hosts and the host identifier not being unique as to another host belonging to another cluster of hosts, wherein the creating comprises creating the session identifier by including the host identifier as part of the created session identifier;
   formulating, by the host device, a host session initiation message with the created session identifier, wherein the host device is a source of the content requested by the client;
   storing the host identifier at the host device, and wherein the host identifier is divided and dispersed across a first field of the session identifier by the host device when creating the session identifier;
   establishing, by the host device, the corresponding session to which the created session identifier is assigned, wherein a type of the corresponding session to which the created session identifier is assigned comprises one of a Secure Sockets Layer (SSL) session; a Transport Layer Security (TLS) session, a secure internet protocol (IPSec) session; a hyper text transfer protocol cookie-based session, a point-to-point tunneling protocol (PPTP) session, an IPSec/layer-2 tunneling protocol (L2TP) session, a proprietary session, a terminal server session, or an administrator-defined session;
   establishing, by the host device, at least one layer comprising at least two of the types of sessions;
   populating a second field of the session identifier with a value increasing uniqueness for the session identifier, the session identifier comprising the first field and the populated second field; and
   formulating a host session initiation message to include the first field and the populated second field for a given session, wherein a content of the first field and a content of the populated second particular field is returned unaltered in a client session continuation message for the given session.

37. The host device as recited in claim 36, wherein the operations further comprise:
   creating the session identifier using the host identifier and at least one of the following values: a randomly selected value, a value from an incrementing counter, a security-related value, or a hashed value; and
   sending, by the host device, the host session initiation message that includes the session identifier from the host device, wherein the host identifier is associated with the host device.

38. The host device as recited in claim 36, wherein the operations further comprise sending the host session initiation message that includes the created session identifier.

39. The host device as recited in claim 36, wherein the operations further comprise sending, by the host device, the host session initiation message that comprises a host session continuation message.

40. The host device as recited in claim 36, wherein the operations further comprise sending, by the host device, the host session initiation message that includes the session identifier from the host device towards a client.

41. The host device as recited in claim 36, wherein the operations further comprise sending, by the host device, the host session initiation message that includes the session identifier from the host device towards a client via a network gateway and over an intranet to which the host device is connected.

42. The host device as recited in claim 36, wherein the operations further comprise:
   receiving a client session message; and
   determining if the received client session message includes a received session identifier.

43. The host device as recited in claim 42, wherein the operations further comprise:
   if the received client session message is determined to not include a received session identifier, performing the actions of creating and formulating.

44. The host device as recited in claim 42, wherein the operations further comprise:
   if the received client session message is determined to include a received session identifier, then performing actions of:
   formulating a host session continuation message with the received session identifier; and
   sending the host session continuation message that includes the received session identifier.

45. The host device as recited in claim 36, wherein the formulating operation further comprises inserting the created session identifier into a session identifier field of a host session message to generate the host session initiation message.

46. The host device as recited in claim 45, wherein the formulating further comprises populating a plurality of other fields of the host session message to generate the host session initiation message.

47. The host device as recited in claim 36, wherein the host identifier comprises a device identifier.

48. The host device as recited in claim 47, wherein the device identifier comprises at least one of a network address and a key that maps to the network address.

49. The host device as recited in claim 36, wherein the host identifier comprises a device identifier and an application identifier.

50. The host device as recited in claim 36, wherein the host identifier comprises a key that maps to a network address and an application identifier.

51. The host device as recited in claim 36, wherein the computer-executable instructions comprise a server program.

52. The host device as recited in claim 36, wherein the computer-executable instructions comprise an operating system program.

53. A system comprising:
at least one processor; and
one or more media including processor-executable instructions that, when executed by the at least one processor, direct the system to perform operations comprising:
receiving, by the system, a request from a device for a content;
creating, by the system, a session identifier using a host identifier, the host identifier being unique to a host across a plurality of hosts belonging to a cluster of hosts and the host identifier not being unique as to another host belonging to another cluster of hosts, wherein the creating comprises creating the session identifier by including the host identifier as part of the created session identifier;
formulating, by the system, a host session initiation message with the created session identifier, wherein the system is a source of the content requested by the device;
storing the host identifier at the host device, and wherein the host identifier is divided and dispersed across a first field of the session identifier by the host device when creating the session identifier;
establishing, by the host device, the corresponding session to which the created session identifier is assigned, wherein a type of the corresponding session to which the created session identifier is assigned comprises one of a Secure Sockets Layer (SSL) session; a Transport Layer Security (TLS) session, a secure internet protocol (IPSec) session; a hyper text transfer protocol cookie- based session, a point-to-point tunneling protocol (PPTP) session, an IPSec/layer-2 tunneling protocol (L2TP) session, a proprietary session, a terminal server session, or an administrator-defined session;
establishing, by the host device, at least one layer comprising at least two of the types of sessions;
populating a second field of the session identifier with a value increasing uniqueness for the session identifier, the session identifier comprising the first field and the populated second field; and
formulating a host session initiation message to include the first field and the populated second field for a given session, wherein a content of the first field and a content of the populated second particular field is returned unaltered in a client session continuation message for the given session.

54. The system as recited in claim 53, wherein the host identifier comprises a device identifier and an application identifier.

55. The system as recited in claim 53, wherein the host identifier comprises a key that maps to a network address and an application identifier.

56. The system as recited in claim 53, wherein the operations further comprise:
populating a session identifier field with a code signifying the host participant and a client participant to a session, wherein the client participant is associated with a plurality of client device identifiers, and the code facilitates the client participant accessing the session from a corresponding plurality of client devices; and
formulating a host session message from the host device to include the populated session identifier field, wherein the code is capable of communicating information to devices other than the host device and the plurality of client devices.

* * * * *